United States Patent
Coulmeau et al.

(10) Patent No.: US 8,914,227 B2
(45) Date of Patent: Dec. 16, 2014

(54) METHOD OF GENERATING AN AIRCRAFT FLIGHT PLAN

(75) Inventors: François Coulmeau, Seilh (FR); Olivier Friedmann, Toulouse (FR); Jean-Christophe Jaillant, Tournefeuille (FR)

(73) Assignee: Thales, Neuilly-sur-Seine (FR)

( * ) Notice: Subject to any disclaimer, the term of this patent is extended or adjusted under 35 U.S.C. 154(b) by 1622 days.

(21) Appl. No.: 12/124,298

(22) Filed: May 21, 2008

(65) Prior Publication Data

US 2008/0300739 A1  Dec. 4, 2008

(30) Foreign Application Priority Data

May 29, 2007  (FR) ..................................... 07 03785

(51) Int. Cl.
  *G08G 5/00* (2006.01)
  *G01C 21/00* (2006.01)
  *G01C 23/00* (2006.01)

(52) U.S. Cl.
  CPC .............. *G01C 21/00* (2013.01); *G08G 8/0034* (2013.01); *G01C 23/005* (2013.01)
  USPC ........ 701/122; 701/3; 701/4; 701/16; 701/120

(58) Field of Classification Search
  CPC ...... G01C 23/005; G01C 23/00; G01C 21/20; G01C 21/005; G01C 21/00; G08G 5/0021; G08G 5/0039; G08G 5/003; G08G 5/0034; G08G 5/0091; G09B 29/10; G05D 1/0202; G05D 1/0607; G05D 1/0005
  USPC ............ 701/3, 4, 8, 9, 14, 16, 120, 122, 200, 701/202, 204, 206, 121, 492, 528; 244/75.1, 76, 81, 175, 183
  See application file for complete search history.

(56) References Cited

U.S. PATENT DOCUMENTS

| | | | | |
|---|---|---|---|---|
| 4,086,632 A | * | 4/1978 | Lions | 701/418 |
| 4,413,322 A | * | 11/1983 | Foster et al. | 701/467 |
| 4,692,869 A | * | 9/1987 | King et al. | 701/467 |
| 4,812,990 A | * | 3/1989 | Adams et al. | 701/3 |
| 5,475,594 A | * | 12/1995 | Oder et al. | 701/14 |
| 5,526,265 A | * | 6/1996 | Nakhla | 701/16 |
| 5,758,297 A | * | 5/1998 | Gaultier | 701/14 |
| 5,797,106 A | * | 8/1998 | Murray et al. | 701/11 |
| 6,148,259 A | * | 11/2000 | Hagelauer | 701/122 |
| 6,236,913 B1 | * | 5/2001 | Bomans et al. | 701/3 |
| 6,269,301 B1 | * | 7/2001 | Deker | 701/411 |

(Continued)

FOREIGN PATENT DOCUMENTS

FR  2853064  10/2004

*Primary Examiner* — Stephen Holwerda
(74) *Attorney, Agent, or Firm* — Lowe Hauptman & Ham, LLP

(57) ABSTRACT

A method of generating a flight plan including a number N-1 of segments $SG_i$, i being an integer number between 2 and N. Segment $SG_i$ links an auxiliary departure position to an auxiliary arrival position according to a route. The route is a straight line defined by a list of auxiliary route positions. Each route is stored in a database onboard the aircraft. The method includes a coupled determination of an auxiliary arrival position that is part of the auxiliary positions of at least one of the routes and of a route followed by the segment $SG_{i+1}$. The coupled determination is produced from an auxiliary departure position and a route $R_i$ followed by the segment $SG_i$.

8 Claims, 5 Drawing Sheets

(56) References Cited

U.S. PATENT DOCUMENTS

| | | | |
|---|---|---|---|
| 6,389,355 B1 * | 5/2002 | Gibbs et al. | 701/467 |
| 6,707,475 B1 | 3/2004 | Snyder | |
| 6,751,545 B2 * | 6/2004 | Walter | 701/120 |
| 6,856,864 B1 | 2/2005 | Gibbs et al. | |
| 6,922,631 B1 * | 7/2005 | Dwyer et al. | 701/528 |
| 2002/0120392 A1 * | 8/2002 | Stratton et al. | 701/120 |
| 2002/0161514 A1 * | 10/2002 | Shinagawa | 701/209 |
| 2004/0193334 A1 * | 9/2004 | Carlsson et al. | 701/9 |
| 2005/0137758 A1 * | 6/2005 | He et al. | 701/3 |
| 2006/0025899 A1 * | 2/2006 | Peckham et al. | 701/3 |

* cited by examiner

| SID | PIL1HL | PILUL |
|-----|--------|-------|
| DIR |        | TINIL |
| DIR |        | DERAK |
| AWY | UL856  | KPT   |
| AWY | UL608  | ERKIR |
| DIR |        | GOLVA |
| AWY | UL604  | ZAG   |
| AWY | L603   | DER   |
| DIR |        | VAL   |
| DIR |        | TPL   |
| AWY | L863   | RAVAK |
| AWY | N739   | NISVA |
| AWY | A4     | ADORU |
| AWY | UL614  | YAA   |
| AWY | UA16   | DASNI |
| DIR |        | TOBAL |
| AWY | UR78   | NIKAS |
| AWY | R785   | ZELAF |
| DIR |        | RASLI |
| AWY | UR785  | TRF   |
| AWY | V45    | KEDAT |
| AWY | R219   | TUGOS |
| AWY | A791   | SHJ   |
| AWY | P307   | PARAR |
| DIR |        | BILAT |
| DIR |        | SUMOS |
| DIR |        | BBB   |
| AWY | B466   | MMV   |
| AWY | B466   | VBA   |
| AWY | A464   | PKN   |
| AWY | G464   | BLI   |
| AWY | A576   | AS    |
| AWY | A461   | LEC   |
| AWY | H164   | ML    |
| DIR |        | 7ML   |
| APP | V27    | RW27  |

FIG.2

METHOD OF GENERATING AN AIRCRAFT FLIGHT PLAN

RELATED APPLICATIONS

The present application is based on, and claims priority from, French Application Number 07 03785, filed May 29, 2007, the disclosure of which is hereby incorporated by reference herein in its entirety.

FIELD OF THE INVENTION

The field of the invention is that of the generation of an aircraft flight plan. The invention more specifically relates to a method of generating a flight plan by a dedicated computer, before the aircraft starts up or even during a flight to prepare a diversion of an aircraft from a planned trajectory.

BACKGROUND OF THE INVENTION

Current aircraft have three levels of piloting equipment:
a first level of equipment consisting of flight controls acting directly on the control surfaces and the engines,
a second level of equipment consisting of the automatic pilot and/or the flight director acting on the flight controls, directly for the automatic pilot or via the pilot for the flight director, to slave the aircraft to a flight parameter such as, for example, heading, roll, pitch, altitude, speed, etc., and
a third level of equipment consisting of the flight management computer (FMS) which is capable of generating a flight plan and acting on the automatic pilot or the flight director to have it followed by the aircraft.

The flight management computer FMS, hereinafter called flight computer FMS, has, among other main functions, the generation and the automatic following of a flight plan, a flight plan consisting of lateral and vertical trajectories that the aircraft must follow to go from the position that it occupies to its destination, and the speeds with which these trajectories must be travelled.

The generation of a flight plan is done, among other things, from imposed waypoints associated with altitude, time and speed constraints. These imposed waypoints and their associated constraints are introduced, into the flight computer FMS, by an operator of the aircraft, for example a member of the crew of the aircraft, by means of cockpit equipment with keyboard and screen providing the man-machine interface, such as that known by the acronym MCDU, standing for Multipurpose Control and Display Unit. The generation of the flight plan proper, consists in constructing the lateral and vertical trajectories of the flight plan from a sequence of straight line segments starting from a departure point, passing through imposed waypoints and culminating at an arrival point, observing standardized construction rules and taking into account altitude and speed constraints associated with each imposed waypoint.

A flight plan is made up of terminal procedures and successive "route" segments, also called "airways". The terminal procedures are located in the vicinity of the airports: they define the aircraft landing and take off procedures. The routes form a network linking "nodes" linked by meshes. The aircraft generally follow the meshes of this network.

FIG. 1 represents a route map or "airway map": A route is defined by means of an identifier consisting of a succession of alphanumeric characters such as, for example, "UL856", "UL608".

FIG. 2 represents an exemplary flight plan linking the Paris airport to the Melbourne airport. The flight plan takes the form of a table consisting of rows that we identify by a row index i. These rows define successive segments $SG_i$ forming the flight plan.

In the example shown in FIG. 2, the table comprises around 30 rows defining as many flight plan segments. Each row of the table has three columns: a right hand column, a central column and a left hand column.

The right hand column of row i of the table thus contains an identifier of an exit point $PAA_i$ from the segment $SG_i$.

The left hand column of row i of the table contains an indicator of the type of segment to which the exit point $PAA_i$ belongs (for example AWY for "Airway", DIR for "DIRECT").

Finally, the central column of row i of the table optionally contains a route identifier to be followed to reach the exit point $PAA_i$ (for example the name of the SID, of the airway, etc.).

The routes are stored in the database BDR onboard the aircraft. These are straight lines defined by a list of auxiliary route points.

When the exit point $PAA_i$ is a geographic reference point which is not part of the auxiliary route points stored in the database BDR, the join indicator is set to "DIR", and the central column is empty. The terms "direct trajectories" or "DIRECT" segment apply.

When the exit point is a geographic point which is part of the auxiliary route points stored in the BDR, the join indicator is set to "AWY". In this case, the central column of row i contains the identifier of the route chosen to link the exit point of row i−1 and the exit point of row i.

In particular situations such as an aircraft take off or landing, the join indicator is set to "SID" or "APP".

A flight plan assigned to the aircraft is read and is built row by row. Thus, the flight plan represented in FIG. 2 begins with a take off procedure "SID" with which to join with the point PILUL along the route PIL1HL.

The aircraft must then be directed successively by direct trajectories to two geographic reference points ("TINIL" and "DERAK"), then from "DERAK", the aircraft follows the route "UL856" to the junction point between the routes "UL856" and "UL608" named "KPT". From the junction point "KPT", it then bifurcates on the route "UL608".

Then, the aircraft exits from the route "UL608" at "ERKIR" then performs a DIRECT to "GOLVA" where it enters the following route ("UL 604"), and so on, until the position of the arrival airport is reached.

Routes are entered into an FMS of recent design through an alphanumeric keyboard, by an operator manually entering the identifier of the routes.

FIG. 3a illustrates an example of "routes" pages of an FMS which is presented to an aircraft operator on an MCDU. This page enables an operator to enter into the FMS the information needed to generate a flight plan.

The flight plan generation methods according to the prior art are based on successive determinations of segments forming the flight plan. In the example represented in FIG. 3a, the operator has chosen, from the point "FISTO", the route "UN874", then the route "UT191" that is, he has used an alphanumeric keyboard to successively enter these two identifiers.

From the first two routes entered, the flight plan generation method according to the prior art automatically determines a junction point "BAMES".

Subsequently, an input, or a selection of the route identifier "UT426", enables the flight plan generation method to determine the junction point "ABUDA". The operator finally chooses an exit point from the last route: "DIMAL".

In the most recent FMS systems which include a "windows" type interface, commonly called MFD (Multi Function Display), the entry of a route to generate a flight plan is based on a route selection by means of a drop-down menu offering the operator a list of route identifiers, as represented in FIG. 3b.

For example, the drop-down menu presented to the operator on an MFD presents to the operator a limited number, for example ten, route identifiers in alphabetical order of the identifiers. This presentation in particular enables the operator to choose from the displayed identifiers that which corresponds to the route that suits him to build a segment of his flight plan.

In certain situations, for example, to react to an unfavourable change of weather conditions encountered in flight, an aircraft operator, for example a pilot, may have to very rapidly generate a new flight plan. In these situations, a route selection made via a display of a limited number of route identifiers in alphabetical order is unsuitable because it can be relatively lengthy.

In particular, a flight plan, as has been seen, can comprise several tens of segments which require as many manual route selections as are sequentially required. A manual selection can take several minutes. Furthermore, the manipulations required by the operator to select a route are lengthy and tedious when the number of routes passing through a node exceeds the display capability of the drop-down menu.

Finally, in a stress situation, it is difficult for the operator to choose a relevant route simply by studying the route identifiers. This type of presentation does not help lighten the workload of the operator. Finally, the limited number of characters (5) generates major input error potential (for example AWY UL508 and UL608, and so on), given the high number of airways in the navigation databases).

SUMMARY OF THE INVENTION

The aim of the invention is to overcome these drawbacks.

More specifically, the subject of the invention is a method of generating a flight plan enabling an aircraft to link a departure airport AD to a destination airport AA, the flight plan consisting of a number N−1 of segments $SG_i$, i being an integer number between 2 and N uniquely identifying the segment $SG_i$ of the flight plan linking an auxiliary departure position $PAD_i$ to an auxiliary arrival position $PAA_i$ according to a route $R_i$, the route $R_i$ being a straight line defined by a list of auxiliary route positions $PAR_{i,k}$, k identifying the auxiliary route positions, the routes $R_i$ being stored in a database BDR onboard the aircraft, $PAD_1$ being a geographic departure position AD, $PAA_N$ being a geographic arrival position AA, $PAA_i$ and $PAD_{i+1}$ being combined for any integer i between 2 and N−1, characterized in that it comprises a coupled determination:

of an auxiliary arrival position $PAA_i$ that is part of the auxiliary positions of at least one of the routes stored in BDR and, of a route $R_{i+1}$ to be followed by the segment $SG_{i+1}$, and in that the coupled determination is produced from an auxiliary departure position $PAD_i$ and a route $R_i$ to be followed by the segment $SG_i$.

A first benefit of the method according to the invention lies in the compatibility that the coupled determination offers in making a choice by the operator ("manual selection step") or even an automatic choice ("automatic selection step") of the successive auxiliary arrival positions $PAA_i$.

A second benefit of the method according to the invention lies in the capacity that it offers to provide assistance in the step-by-step choice of successive segments of a flight plan, that is, a "local" assistance, or even in proposing an overall flight plan consisting of a succession of segments linking the auxiliary departure point occupied by the aircraft to the arrival airport.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 2, already described, represents an exemplary flight plan linking the Paris airport to the Melbourne airport;

From one figure to another, the same elements are identified by the same references.

DETAILED DESCRIPTION OF THE INVENTION

As reviewed above, the flight plan generation methods according to the prior art are based on successive determination of segments forming the flight plan by an operator.

The flight plan generation methods according to the invention are differentiated therefrom by an assistance that they provide the operator in generating the flight plan. These methods according to the invention are applicable in situations in which the operator chooses to build a flight plan from positions referenced in a database BDR onboard the aircraft, that is, when the junction points between the routes are auxiliary route positions.

Consider a flight plan enabling an aircraft, if it follows it, to link a departure airport AD to a destination airport AA. The flight plan consists of a number N−1, unknown beforehand, of segments $SG_i$, where i is an integer number between 2 and N uniquely identifying the segment $SG_i$ of the flight plan linking an auxiliary departure position $PAD_i$ to an auxiliary arrival position $PAA_i$ according to a route $R_i$.

$PAD_1$ is a geographic position of the departure airport AD. $PAA_N$ is a geographic position of the arrival airport AA. $PAA_i$ and $PAD_{i+1}$ are combined for any i between 2 and N−1.

The routes are stored in the database BDR onboard the aircraft. These are straight lines defined by a list of auxiliary route points $PAR_{i,k}$ in which k uniquely identifies an auxiliary route position.

The method according to the invention consists of a coupled determination of an auxiliary arrival position $PAA_i$ that is part of the auxiliary positions of at least one of the routes stored in BDR and of a route $R_{i+1}$ to be followed by the segment $SG_{i+1}$.

This coupled determination is made from an auxiliary departure position $PAD_i$ and a route $R_i$ to be followed by the segment $SG_i$:

Advantageously, the coupled determination comprises:
- a step for inventorying potential auxiliary arrival positions from the auxiliary route positions stored in BDR and,
- a step for classifying the inventoried potential auxiliary arrival positions $PP_{i,n}$ in a predefined order.

Advantageously, the coupled determination also comprises a step for manual selection by an operator of the aircraft of an auxiliary arrival position $PAA_i$ from the inventoried potential auxiliary arrival positions.

Advantageously, the coupled determination also comprises a step for automatic selection as auxiliary arrival position $PAA_i$ of the inventoried potential auxiliary arrival position which is classified in the first rank in the predefined order.

The automatic selection of the auxiliary arrival position $PAA_i$ makes it possible to generate a flight plan very rapidly. The use of this automatic selection is, however, to be reserved only for extremely hazardous situations requiring a rapid reaction.

Various embodiments of the method according to the invention can be distinguished, depending on the nature of the inventorying step.

Figure 1:
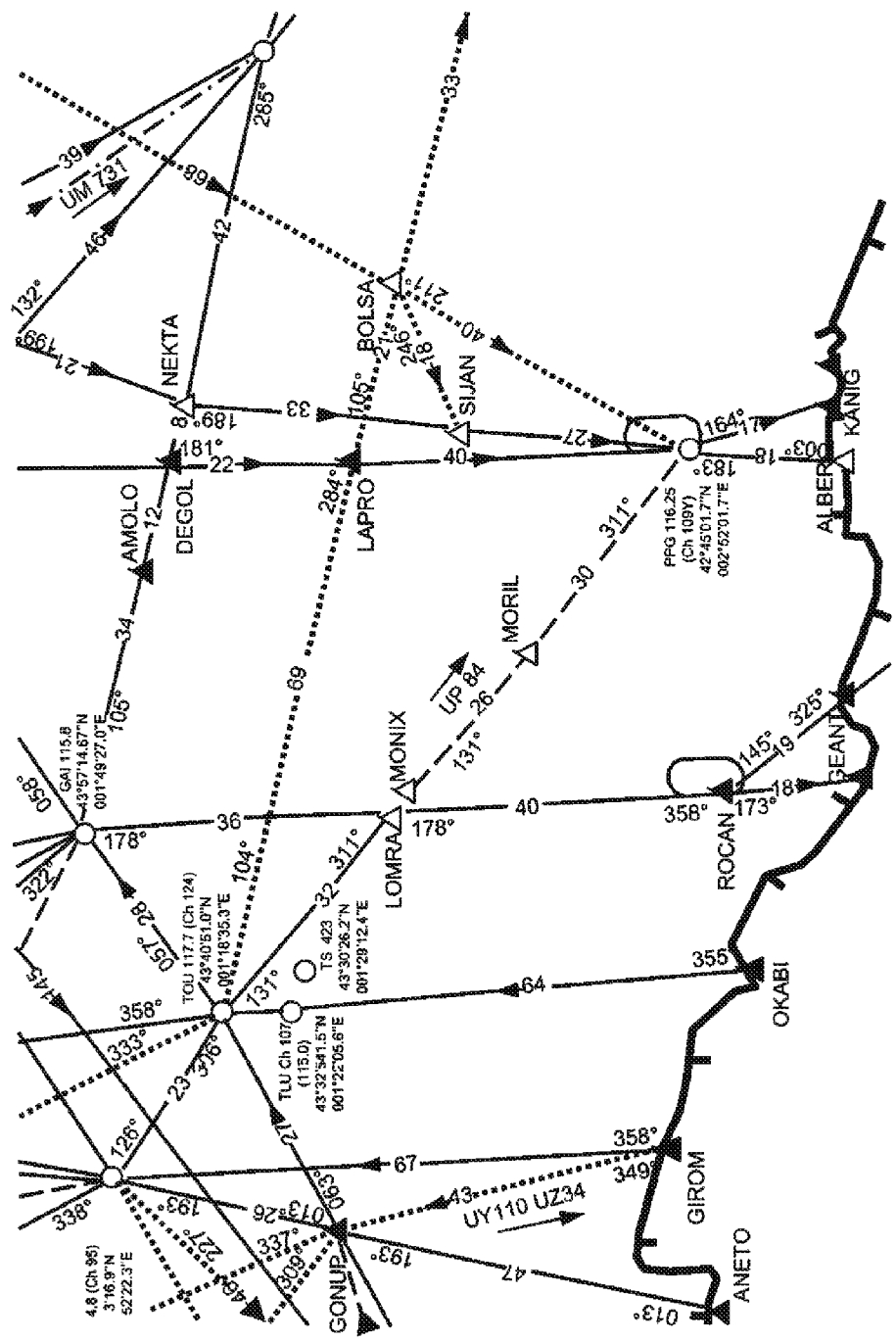
FIG. 1, already described, represents a route map.
Figure 3B:
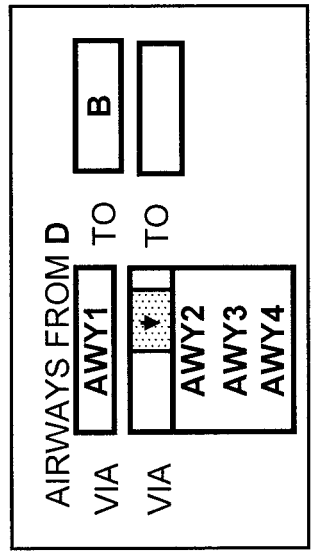
FIG. 3b, already described, represents an MFD interface enabling the step-by-step generation of a flight plan.
Figure 3A:
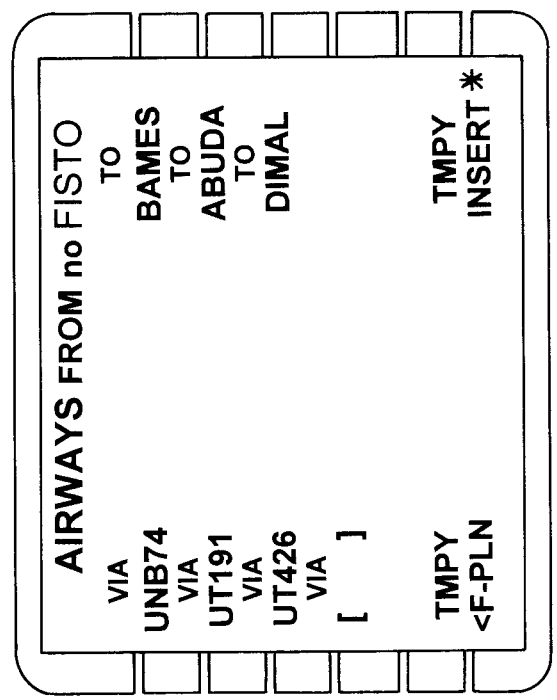
FIG. 3a, already described, illustrates an exemplary "route" page of an FMS which is presented to an aircraft operator on an MCDU.
Figure 4:
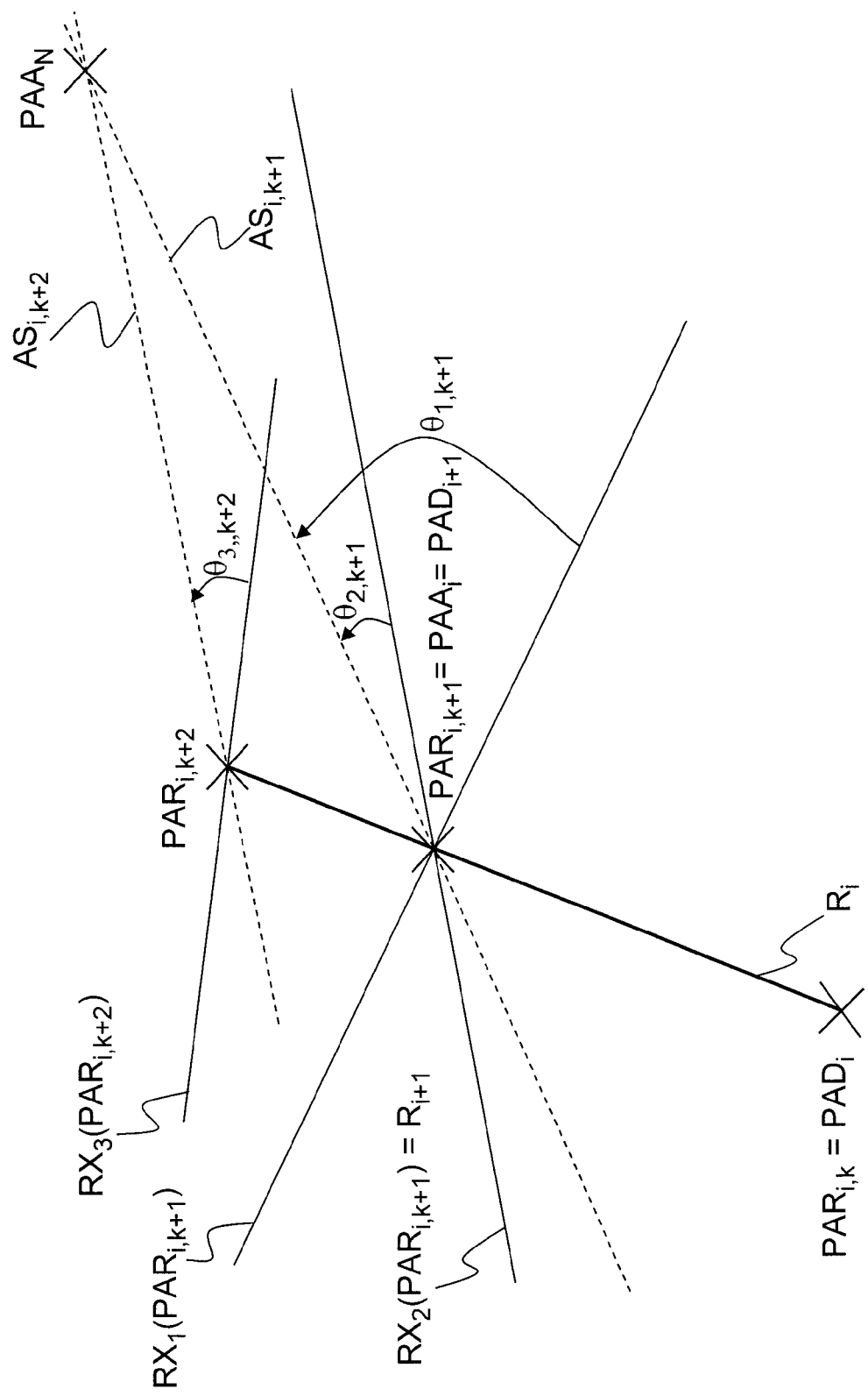
FIG. 4 illustrates a first mode of operation of the flight plan generation method according to the invention.

FIG. 4 illustrates a first mode of operation of the method according to the invention: $PAD_i$ is an auxiliary departure position. $PAA_N$ is a geographic position of the arrival airport. $R_i$ is the route followed by the aircraft and $R_i$ is defined by a list of auxiliary route positions $PAR_{i,k}$: the aim is to determine $PAA_i$.

Advantageously, the classification step comprises a substep for identifying interception routes $RX_j(PAR_{i,k})$ which intercept the auxiliary route positions $PAR_{i,k}$, where j is an integer number which uniquely identifies a route stored in BDR for which an auxiliary route position is $PAR_{i,k}$.

Considering FIG. 4, starting from the auxiliary departure position $PAD_i$ which corresponds to the auxiliary route position $PAR_{i,k}$ and following the direction of the route $R_i$, for each auxiliary route position of the route $R_i$, that is, for the example represented $PAR_{i,k+1}$ and $PAR_{i,k+2}$, there are inventoried the interception routes $RX_1(PAR_{i,k+1})$ and $RX_2(PAR_{i,k+1})$ which intercept the auxiliary route position $PAR_{i,k+1}$ and the interception route $RX_3(PAR_{i,k+2})$ which intercepts the auxiliary route position $PAR_{i,k+2}$.

More generally, the interception routes are designated $RX_j(PAR_{i,k})$ where j is an integer number which uniquely identifies a route stored in BDR for which an auxiliary route position is $PAR_{i,k}$.

Also consider an axis $AS_{i,k+1}$ linking the auxiliary route position $PAR_{i,k+1}$ to the arrival position $PAA_N$ and an axis $AS_{i,k+2}$ linking the auxiliary route position $PAR_{i,k+2}$ to the arrival position $PAA_N$. The axes $AS_{i,k}$ are named "exit axis deriving from $PAR_{i,k}$".

The interception routes $RX_j(PAR_{i,k})$ form with the axis $AS_{i,k}$ an exit angle $\square_{j,k}$. $\square_k$ is then considered to be the minimum value of $\square_{j,k}$ for any integer j.

Finally, the auxiliary route positions $PAR_{i,k}$ are classified by ascending exit angle value $\square_k$.

In the example of FIG. 4, $\square_{k+1}$ is equal to $\square_{2,k+1}$ and $\square_{k+2}$ is equal to $\square_{3,k+2}$. Observing that $\square_{2,k+1}$ is visibly less than $\square_{2,k+2}$, classifying the auxiliary route positions according to an increasing exit angle amounts to placing $PAR_{i,k+1}$ in front of $PAR_{i,k+2}$.

There is thus selected an auxiliary arrival position $PAA_i$ ($PAR_{i,k+1}$) and a route to be followed by the segment $SG_{i+1}$ ($RX_2(PAR_{i,k+1})$). The coupled determination performed with the order i can be repeated with the order i+1.

Figure 5:
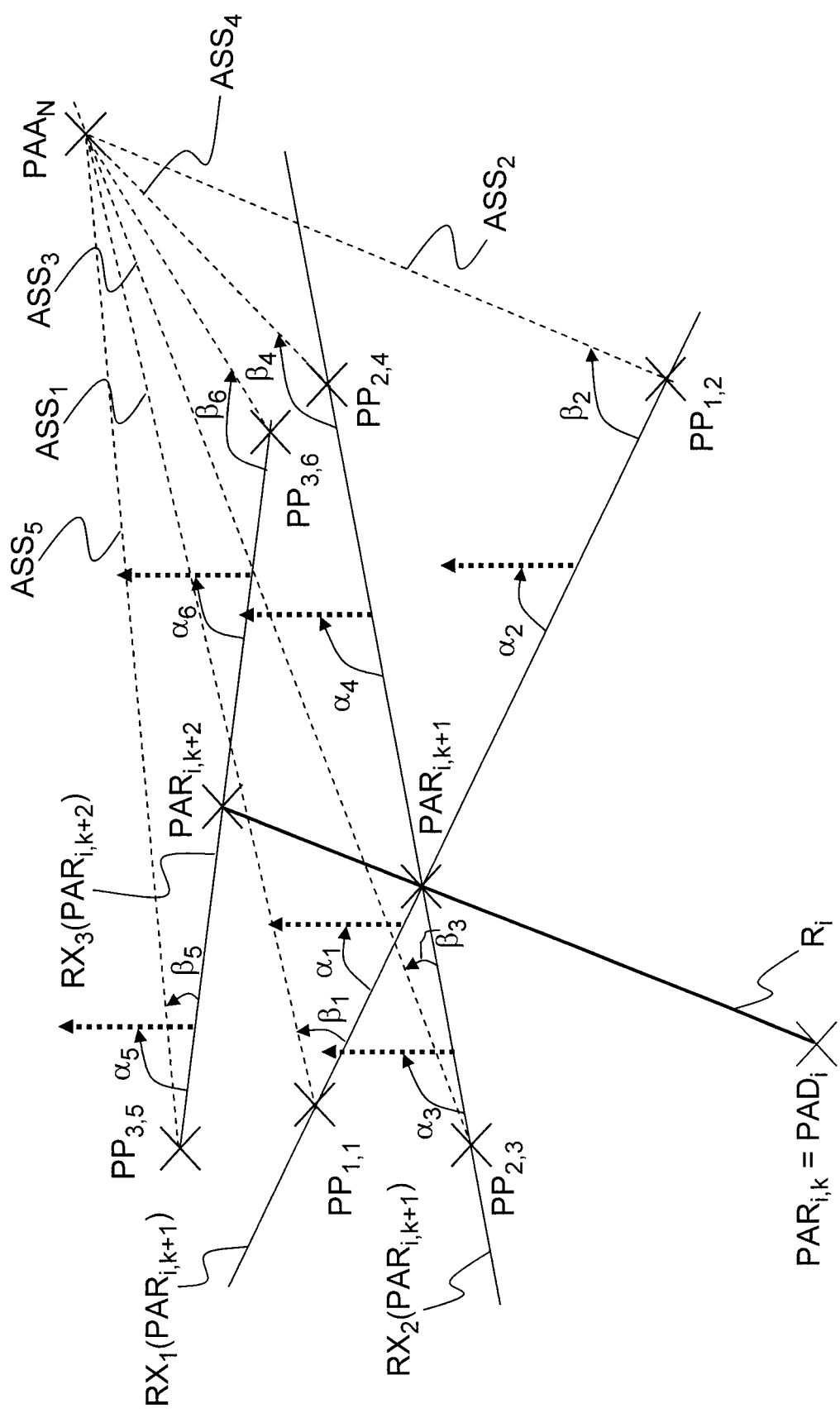
FIG. 5 illustrates second, third and fourth modes of operation of the method according to the invention.

FIG. 5 makes it possible to illustrate three other embodiments of the flight plan generation method according to the invention.

Advantageously, the classification step also comprises a substep for identifying auxiliary route positions $PP_{j,l}$ of the routes $RX_j(PAR_{i,k})$ to determine an auxiliary arrival position $PAA_{i+1}$, in which l uniquely identifies an auxiliary route position.

FIG. 5 corresponds to a similar situation to that of FIG. 4: the departure position $PAD_i$ is known as is the route $R_i$ followed by the segment $SG_i$.

First to be inventoried are the interception routes $RX_1(PAR_{i,k+1})$ and $RX_2(PAR_{i,k+1})$ which intercept the auxiliary route position $PAR_{i,k+1}$ and the interception route $RX_3(PAR_{i,k+2})$ which intercepts the auxiliary route position $PAR_{i,k+2}$.

There are then identified auxiliary route positions $PP_{j,l}$ of the routes $RX_j(PAR_{i,k})$ to determine an auxiliary arrival position $PAA_{i+1}$, where l uniquely identifies an auxiliary route position.

In the example of FIG. 5, this amounts to identifying $PP_{1,1}$ and $PP_{1,2}$ which are part of $RX_1(PAR_{i,k+1})$, $PP_{2,3}$ and $PP_{2,4}$ which are part of $RX_2(PAR_{i,k+1})$, and $PP_{3,5}$ and $PP_{3,6}$ which are part of $RX_3(PAR_{i,k+2})$.

A second embodiment is based on minimizing the auxiliary distance to be travelled:

Advantageously, the classification step also comprises a substep for sequencing the potential auxiliary arrival positions in an increasing auxiliary distance order, in which the auxiliary distance is a sum between a distance separating $PAD_i$ and $PAR_{i,k}$, a distance separating $PAR_{i,k}$ and $PP_{j,l}$ and a distance separating $PP_{j,l}$ and $PAA_N$.

In the example of FIG. 5, it can be seen that the auxiliary distance is minimum when $PAA_i$ is $PAR_{i,k+2}$ and $PAA_{i+1}$ is $P_{3,6}$. In fact, the method evaluates the various auxiliary distances, and determines which is the itinerary that minimizes the auxiliary distance.

Thus, for the example represented in FIG. 5, classifying the auxiliary route positions in an ascending order of auxiliary distance amounts to placing $PAR_{i,k+2}$ before $PAR_{i,k+1}$.

There are thus selected an auxiliary arrival position $PAA_i$ ($PAR_{i,k+2}$), a route to be followed by the segment $SG_{i+1}$ ($RX_3(PAR_{i,k+2})$) and an auxiliary arrival position $PAA_{i+1}$ ($P_{3,6}$). The coupled determination performed with the order i can be repeated with the order i+1 until the index N−1 is reached.

A third embodiment is based on a minimization of the auxiliary angle:

An axis $ASS_{j,l}$ is defined as being a segment that links the auxiliary route position $PP_{j,l}$ to $PAA_N$ and an auxiliary angle $\square_l$ as being equal to a sum between an angle $\square_l$ formed by $RX_j(PAR_{i,k})$ and the direction of North and an angle $\square_l$ formed by the route $RX_j(PAR_{i,k})$ and the axis $ASS_j$.

In FIG. 5, the direction of North is represented by a broken line arrow.

Advantageously, the classification step also comprises a substep for sequencing the potential auxiliary arrival positions according to a descending auxiliary angle value, in which the auxiliary angle is a sum of an angle formed by $RX_j(PAR_{i,k})$ and the direction of North and an angle formed by the route $RX_j(PAR_{i,k})$ and the axis $ASS_{j,l}$.

In the example of FIG. 5, it can be seen that the auxiliary angle $\square_j = \square_i + \square_l$ is minimum when $PAA_i$ is $PAR_{i,k+1}$ and $PAA_{i+1}$ is $P_{2,4}$. In fact, the method according to the invention evaluates the various auxiliary angles and determines which is the itinerary that minimizes the auxiliary angle corresponding to each auxiliary route position $PP_{j,l}$.

Thus, for the example represented in FIG. 5, classifying the auxiliary route positions in increasing auxiliary angle order amounts to placing $PAR_{i,k+1}$ before $PAR_{i,k+2}$.

There is thus selected an auxiliary arrival position $PAA_i$ ($PAR_{i,k+1}$), a route to be followed by the segment $SG_{i+1}$ ($RX_2$ ($PAR_{i,k+1}$)) and an auxiliary arrival position $PAA_{i+1}$ ($P_{2,4}$). The coupled determination performed with the order i can be repeated with the order i+1 until the index N−1 is reached.

A fourth embodiment is based on a minimization of the length value of the path remaining to be travelled:

Advantageously, the classification step consists in sequencing the potential auxiliary arrival positions according to a descending length value of the path remaining to be travelled, in which the length of the path remaining to be travelled is evaluated by a minimum distance calculation algorithm.

For example, a MOORE-DIJKSTRA type algorithm or even an algorithm A*.

This embodiment of the method according to the invention has a computation time greater than that of the embodiments described previously. However, this drawback is offset by the advantage represented by the fact that an "overall" length of the path remaining to be travelled is taken into account, rather than a "local" path length of the path remaining to be travelled.

In order to reduce the computation time, for all the embodiments of the method according to the invention, the method can be limited to considering auxiliary route positions belonging only to a selection area of predefined dimensions.

Advantageously, the step for inventorying auxiliary arrival positions $PAA_i$ is limited to within a selection area of predefined dimensions, and the selection area has a position linked to the auxiliary departure position $PAD_i$.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of generating a flight plan enabling an aircraft to link a departure airport having a geographical position to a destination airport having a geographical position, wherein the flight plan includes a number of segments (SGi) corresponding to a value of N-1, a segment corresponding to a route and being defined by an auxiliary departure position and an auxiliary arrival position, the route being an identified straight line defined by a list of corresponding auxiliary route positions, routes being stored in a database onboard the aircraft, the method comprises the following iterative steps executed from i to N-1, beginning at i=1:

first identifying, using a processor, an auxiliary departure position and a route corresponding to a segment i, said segment ending at an arrival position to be determined;

second identifying, using the processor, auxiliary route positions located on the route after the auxiliary departure position and in a limited area of predefined dimensions;

determining, using the processor, potential auxiliary arrival positions, by inventorying the auxiliary route positions that are localized at intercepts between the route and other routes stored in the database;

classifying, using the processor, the potential auxiliary arrival positions corresponding to the inventoried auxiliary route positions in a predefined order, said step of classifying comprising the steps of:

determining, for each inventoried auxiliary route position, an exit axis linking the inventoried auxiliary route position to the geographical position of said destination airport;

identifying, for each inventoried auxiliary route position, an interception route intercepting the route at the inventoried auxiliary route position; and determining, for each identified interception route, a geometric criteria between the interception route and a corresponding exit axis, the geometric criteria being associated with the interception route;

selecting an auxiliary arrival position from the classified potential auxiliary arrival positions;

selecting an interception route from the identified interception routes; and until i=N-1, adding 1 to i and returning to the first identifying step where (a) first identifying an auxiliary departure position corresponds to identifying the just selected auxiliary arrival position and (b) first identifying a route corresponding to a segment corresponds to identifying the just selected interception route.

2. The method according to claim 1, wherein
the step of selecting the auxiliary arrival position comprises manually selecting the auxiliary arrival position by an operator of the aircraft, and
the step of selecting the interception route comprises manually selecting the interception route by the operator of the aircraft.

3. The method according to claim 1, wherein
the step of selecting the auxiliary arrival position comprises automatically selecting, using the processor, a first ranked of the classified potential auxiliary arrival positions as the selected inventoried potential auxiliary arrival position.

4. The method according to claim 1, wherein the geometric criteria is an exit angle between the interception route and the corresponding exit axis.

5. The method according to claim 4, wherein the step of classifying further comprises classifying the inventoried auxiliary route positions by ascending values of the exit angles.

6. The method according to claim 5, wherein the step of selecting the interception route comprises automatically selecting, using the processor, an interception route associated with an exit angle having a smallest value of the exit angles.

7. The method according to claim 1, wherein the exit axis determined in the step of classifying directly links the inventoried auxiliary portion to the geographical position of said destination airport.

8. The method according to claim 1, wherein after the step of classifying, said each inventoried auxiliary route position is localized at an intercept between the route, the interception route, and the exit axis connecting to the geographical position of said destination airport.

* * * * *